United States Patent
Bandeali et al.

(10) Patent No.: US 11,245,663 B1
(45) Date of Patent: Feb. 8, 2022

(54) SYSTEMS AND METHODS FOR DETECTING THE IPV4 ADDRESS AND THE IPV6 ADDRESS OF A PURPORTED END USER DEVICE OVER A NETWORK

(71) Applicant: Pixalate, Inc., Palo Alto, CA (US)

(72) Inventors: Muhammad Amin Bandeali, Los Angeles, CA (US); Jalal Nasir, Los Angeles, CA (US); Angelos Lazaris, Los Angeles, CA (US); Dave Tessman, La Crescenta, CA (US); Jason Dias, Lakewood, CA (US)

(73) Assignee: Pixalate, Inc., Palo Alto, CA (US)

( * ) Notice: Subject to any disclaimer, the term of this patent is extended or adjusted under 35 U.S.C. 154(b) by 0 days.

(21) Appl. No.: 16/865,545

(22) Filed: May 4, 2020

Related U.S. Application Data

(60) Provisional application No. 62/843,043, filed on May 3, 2019, provisional application No. 62/923,149, filed on Oct. 18, 2019, provisional application No. 62/916,896, filed on Oct. 18, 2019.

(51) Int. Cl.
| | | |
|---|---|---|
| *H04L 29/12* | (2006.01) | |
| *H04L 29/08* | (2006.01) | |
| *H04L 29/06* | (2006.01) | |
| *H04L 12/851* | (2013.01) | |
| *H04L 12/749* | (2013.01) | |

(52) U.S. Cl.
CPC .......... *H04L 61/251* (2013.01); *H04L 45/741* (2013.01); *H04L 47/2441* (2013.01); *H04L 61/6059* (2013.01); *H04L 63/1425* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 6,690,669 B1 * | 2/2004 | Tsuchiya | H04L 12/66 370/392 |
| 8,190,739 B2 * | 5/2012 | Fernandez Gutierrez | H04M 3/2281 709/224 |
| 8,452,966 B1 * | 5/2013 | Petersen | H04L 63/126 713/176 |
| 10,164,934 B1 * | 12/2018 | Bittfield | H04L 61/1511 |
| 10,230,687 B1 * | 3/2019 | Duleba | H04L 61/6086 |

(Continued)

*Primary Examiner* — Lashonda T Jacobs
(74) *Attorney, Agent, or Firm* — Faegre Drinker Biddle & Reath LLP

(57) ABSTRACT

Embodiments disclosed herein relate to systems, devices, and methods for determining the Internet Protocol Version 4 (IPv4) address and the Internet Protocol Version 6 (IPv6) address of a purported end user device to use for detection and filtering of invalid traffic (IVT). In an exemplary embodiment, a method comprises receiving, at a domain only supporting IPv4, a request from the purported end user device over a network, wherein the purported end user device comprises an IPv6 address and an IPv4 address. The method further comprises redirecting, by the domain only supporting IPv4, the request to a domain supporting IPv6. The method further comprises measuring ad traffic and/or performing user tracking using the IPv4 and IPv6 addresses and fulfilling the request from the purported end user device.

20 Claims, 5 Drawing Sheets

(56) References Cited

U.S. PATENT DOCUMENTS

| | | | | |
|---|---|---|---|---|
| 2002/0073215 | A1* | 6/2002 | Huitema | H04L 69/167 709/230 |
| 2004/0162909 | A1* | 8/2004 | Choe | H04L 61/6086 709/230 |
| 2006/0095585 | A1* | 5/2006 | Meijs | H04L 29/12132 709/245 |
| 2009/0007251 | A1* | 1/2009 | Abzarian | H04L 63/029 726/11 |
| 2011/0110374 | A1* | 5/2011 | Boucadair | H04L 29/12915 370/393 |
| 2011/0153831 | A1* | 6/2011 | Mutnuru | H04L 69/167 709/226 |
| 2013/0080575 | A1* | 3/2013 | Prince | H04L 61/25 709/217 |
| 2013/0235871 | A1* | 9/2013 | Brzozowski | H04L 45/745 370/392 |
| 2014/0258491 | A1* | 9/2014 | Forristal | H04L 61/2592 709/223 |
| 2016/0036943 | A1* | 2/2016 | Kish | H04L 61/1511 709/203 |
| 2016/0344688 | A1* | 11/2016 | Lakhera | H04L 61/251 |
| 2018/0048564 | A1* | 2/2018 | Bianco | H04L 61/1511 |
| 2019/0007371 | A1* | 1/2019 | Burton | H04L 61/251 |
| 2019/0281013 | A1* | 9/2019 | Bao | H04L 61/251 |
| 2020/0137082 | A1* | 4/2020 | Jimenez-Delgado | H04L 63/145 |

\* cited by examiner

SYSTEMS AND METHODS FOR DETECTING THE IPV4 ADDRESS AND THE IPV6 ADDRESS OF A PURPORTED END USER DEVICE OVER A NETWORK

CROSS-REFERENCE TO RELATED APPLICATIONS

This application claims priority to and the benefit of the filing date of the following provisional applications: (i) Provisional Application No. 62/843,043, entitled "Systems and Methods Against OTT/CTV Fraud and/or App Spoofing," filed May 3, 2019; (ii) Provisional Application No. 62/923,149, entitled "Systems and Methods for Detecting the IPv4 Address and the IPv6 Address of a Purported End User Device Over a Network," filed Oct. 18, 2019; and (iii) Provisional Application No. 62/916,896, entitled "Server-Side Ad Insertion Proxy Fraud Detection System," filed Oct. 18, 2019, all of which are incorporated herein by reference in their entireties for all purposes.

FIELD OF THE DISCLOSURE

The present disclosure relates to systems and methods for determining the Internet Protocol Version 4 (IPv4) address and the Internet Protocol Version 6 (IPv6) address of a purported end user device so that both identifiers may be used for detecting and filtering invalid traffic (IVT) in order to protect the digital advertising transactions supply chain.

BACKGROUND OF THE DISCLOSURE

Due to the increasing number of end user devices connected to the internet, internet protocol addresses are transitioning from internet protocol version 4 (IPv4) addresses, which use 32-bit addresses, to internet protocol version 6 (IPv6) addresses, which use 128-bit addresses. During this transition, dual-stack interfaces are being supported. That is, a device is provided with both an IPv4 address and an IPv6 address.

SUMMARY

Embodiments of the present disclosure relate to determining the Internet Protocol Version 4 (IPv4) address and the Internet Protocol Version 6 (IPv6) address of a purported end user device to use such identifiers in detecting and filtering invalid traffic (IVT). Exemplary embodiments include, but are not limited to, the following examples.

In an exemplary embodiment, a computer-implemented method for determining the IPv4 address and the IPv6 address of a purported end user device to use such identifiers in detecting invalid traffic (IVT), the method comprises: receiving, at a domain only supporting IPv4, a request from the purported end user device over a network, wherein the purported end user device comprises an IPv6 address and an IPv4 address; redirecting, by the domain only supporting IPv4, the request to a domain supporting IPv6; measuring ad traffic and/or performing user tracking using the IPv4 and IPv6 addresses; and fulfilling the request from the purported end user device.

In another exemplary embodiment, the method according to the previous paragraph, wherein the domain supporting IPv6 and the domain supporting IPv4 are hosted on different servers.

In another exemplary embodiment, the method according to the first embodiment, wherein the domain supporting IPv4 and the domain supporting IPv6 are hosted on the same server.

In another exemplary embodiment, the method according to any one of the previous paragraphs, wherein redirecting the request to the domain supporting IPv4 comprises sending a hypertext transfer protocol (HTTP) 302 redirect to the purported end user device.

In another exemplary embodiment, the method according to any one of the previous paragraphs, wherein the domain supporting IPv6 is hosted on a dual-stack server.

In another exemplary embodiment, the method according to any one of the previous paragraphs, wherein the request is in response to loading an image pixel.

In another exemplary embodiment, the method according to any one of the previous paragraphs, wherein the request is in response to loading a JavaScript tag.

In another exemplary embodiment, the method according to any one of the previous paragraphs, further comprising assessing a likelihood traffic generated by, or purportedly generated by, the purported end user device is IVT.

In another exemplary embodiment, the method according to the previous paragraph, further comprising filtering traffic associated with the IPv6 address and the IPv4 address of a purported end user device when it is likely that the traffic generated by, or purportedly generated by, the purported end user device is IVT.

In another exemplary embodiment, a server for determining the IPv4 address and the IPv6 address of a purported end user device to use in the detection and filtering or IVT, the server comprising: one or more processors; and memory comprising instructions that, when executed, cause the one or more processors to perform the method of any one of the previous paragraphs.

In another exemplary embodiment, a non-transitory computer readable storage medium for determining the IPv4 address and the IPv6 address of a purported end user device to use in detecting and filtering IVT, the non-transitory computer readable storage medium storing one or more programs comprising instructions that when executed by one or more processors cause the one or more processors to perform the method on any one of the previous paragraphs.

BRIEF DESCRIPTION OF THE DRAWINGS

The above-mentioned and other features and advantages of this disclosure, and the manner of attaining them, will become more apparent and will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION

As the terms are used herein with respect to ranges of measurements (such as those disclosed immediately above), "about" and "approximately" may be used, interchangeably, to refer to a measurement that includes the stated measurement and that also includes any measurements that are reasonably close to the stated measurement, but that may differ by a reasonably small amount such as will be understood, and readily ascertained, by individuals having ordinary skill in the relevant arts to be attributable to measurement error, differences in measurement and/or manufacturing equipment calibration, human error in reading and/or setting measurements, adjustments made to optimize performance and/or structural parameters in view of differences in measurements associated with other components, particular implementation scenarios, imprecise adjustment and/or manipulation of objects by a person or machine, and/or the like.

Although the term "block" may be used herein to connote different elements illustratively employed, the term should not be interpreted as implying any requirement of, or particular order among or between, various steps disclosed herein unless and except when explicitly referring to the order of individual steps. Additionally, a "set" or "group" of items (e.g., inputs, algorithms, data values, etc.) may include one or more items, and, similarly, a subset or subgroup of items may include one or more items.

As set forth above, during the transition from Internet Protocol Version 4 (IPv4) to Internet Protocol Version 6 (IPv6), an end user device and/or purported end user device may be provided with both an IPv4 address and an IPv6 address. Knowing both the IPv4 and the IPv6 address for an end user device and/or purported end user device can be valuable for detecting and filtering invalid traffic (IVT). However, determining both the IPv4 address and the IPv6 address for an end user device and/or purported end user device is challenging because when traffic is sent, or, in the context of certain types of IVT, purports to be sent, between an end user device and a domain where both endpoints support IPv6, only the IPv6 addresses are logged by the domain. The embodiments disclosed herein provide a solution to this problem that is rooted in computer technology. The embodiments disclosed herein can be used across desktop, mobile web, mobile app, and/or over-the-top (OTT)/connected TV (CTV) environments.

Figure 1:
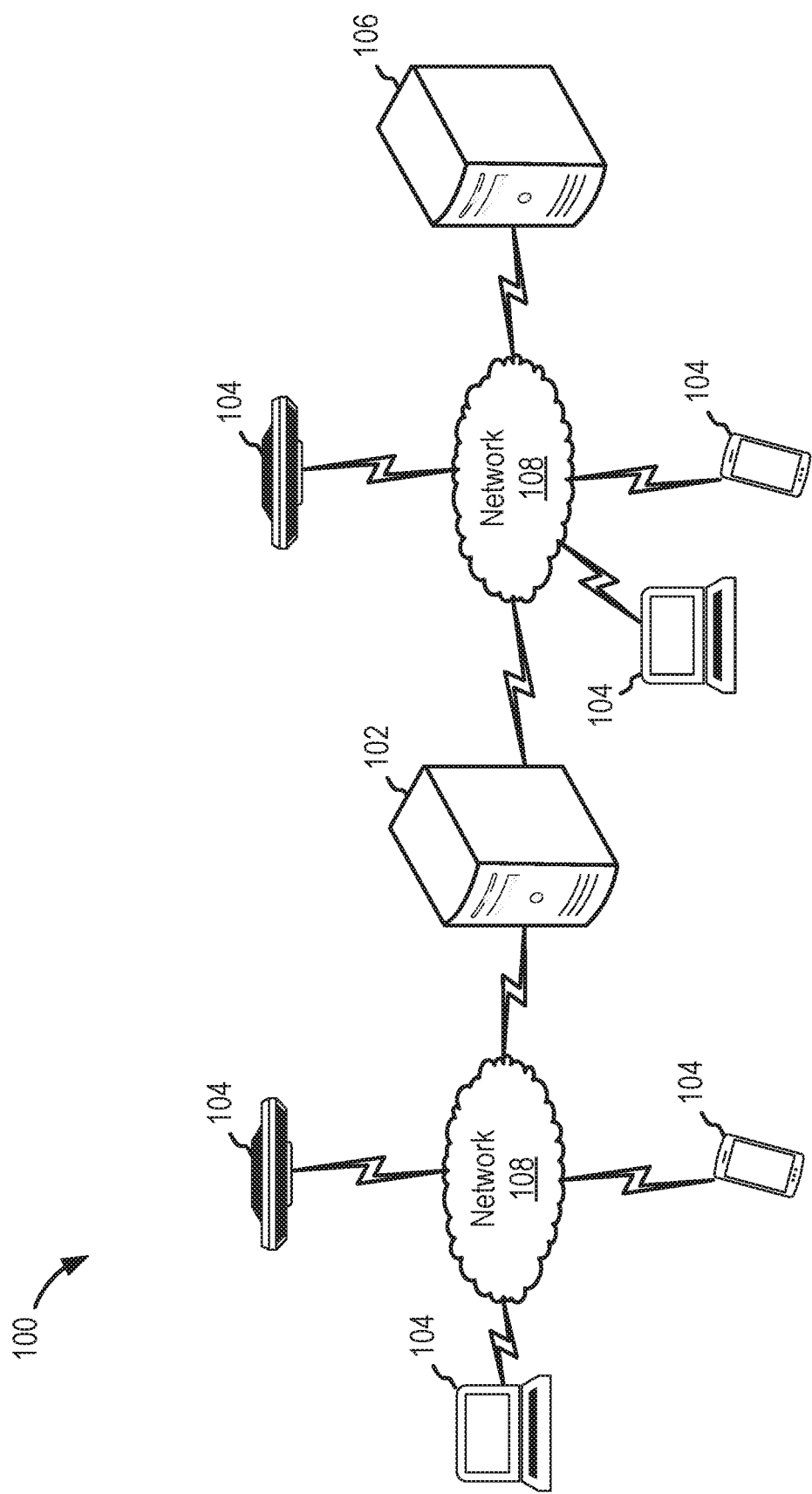
FIG. 1 is a schematic drawing of an illustrative system for determining the Internet Protocol Version 4 (IPv4) address and the Internet Protocol Version 6 (IPv6) address of a purported end user device to use in detecting and filtering invalid web traffic (IVT), according to at least one embodiment of the present disclosure.

FIG. 1 is a schematic drawing of an illustrative system 100 for determining the IPv4 address and the IPv6 address of a purported end user device, according to at least one embodiment of the present disclosure. Determining both the IPv4 and IPv6 addresses may be used for detecting and filtering IVT. This diagram is merely an example, which should not unduly limit the scope of the claims. One of ordinary skill in the art would recognize many variations, alternatives, and modifications.

In some embodiments, the system 100 includes a purported proxy server 102 that coordinates web traffic generated by a plurality of purported end user devices 104. In some embodiments, the system 100 also includes a verification server 106 that may host one or more domains that support IPv4 and/or IPv6, as explained in more detail below. In addition, the verification server 106 is be configured to determine the IPv4 and/or IPv6 addresses of a purported end user device 104 and/or a purported proxy server 102. While the verification server 106 is depicted as being a single server, the functionality of verification server 106 may be embodied in multiple verification servers 106. Additionally, or alternatively, the verification server 106 may determine whether the web traffic generated, or purportedly generated, by the purported end user devices 104 is likely IVT or valid traffic and/or whether the purported proxy server 102 is a server 102 intended to spoof a legitimate proxy server (i.e., the server is not actually serving as a proxy intermediary on behalf of actual end user devices). In some embodiments, the purported end user devices 104 may communicate with the verification server 106 without coordination by a purported proxy server 102.

IVT, as used herein, may include general IVT (GIVT) and/or sophisticated IVT (SIVT). Additionally, or alternatively, IVT may be defined as the same or similar to the Media Rating Council, Inc.'s definition of IVT. In certain embodiments, IVT may represent traffic that does not meet certain ad serving quality or completeness criteria, or otherwise does not represent legitimate ad traffic that should be included in measurement counts. For example, IVT may represent traffic that is a result of non-human traffic (spiders, bots, etc.) or activity designed to produce fraudulent traffic. Stated another way, the verification server 106 determines whether the traffic purportedly coordinated by the purported proxy server 102 and/or provided by the purported end user devices 104 is the result of human traffic interacting with the purported end user devices 104 or whether the traffic purportedly coordinated by the purported proxy server 102 and/or provided by the purported end user devices 102 is the result of non-human traffic (e.g., spiders, bots, etc.) and/or activity that is designed to produce fraudulent traffic (e.g., spoofed HTTP headers, etc.), according to certain embodiments.

End user devices that the purported end user device 104 may be attempting to mimic include, but are not limited to, smart end user devices (e.g., phones, watches, etc.), computers, televisions, set-top boxes, and/or the like. Additionally, or alternatively, the purported proxy server 102 may be intended to spoof a legitimate proxy server.

In certain embodiments, the purported proxy server 102, the purported end user devices 104, and/or the verification server 106 may communicate over one or more networks 108. The network 108 may be, or include, any number of different types of communication networks such as, for example, a bus network, a short messaging service (SMS), a local area network (LAN), a wireless LAN (WLAN), a wide area network (WAN), the Internet, a P2P network, custom-designed communication or messaging protocols, and/or the like. The network 108 may include a combination of multiple networks. While the network 108 for which the purported end user devices 104 communicate with the purported proxy server 102 are depicted as being separate from the network 108 for which the purported proxy server 102 communicates with the verification server 106, those networks 108 might be the same or different networks 108.

Figure 2:
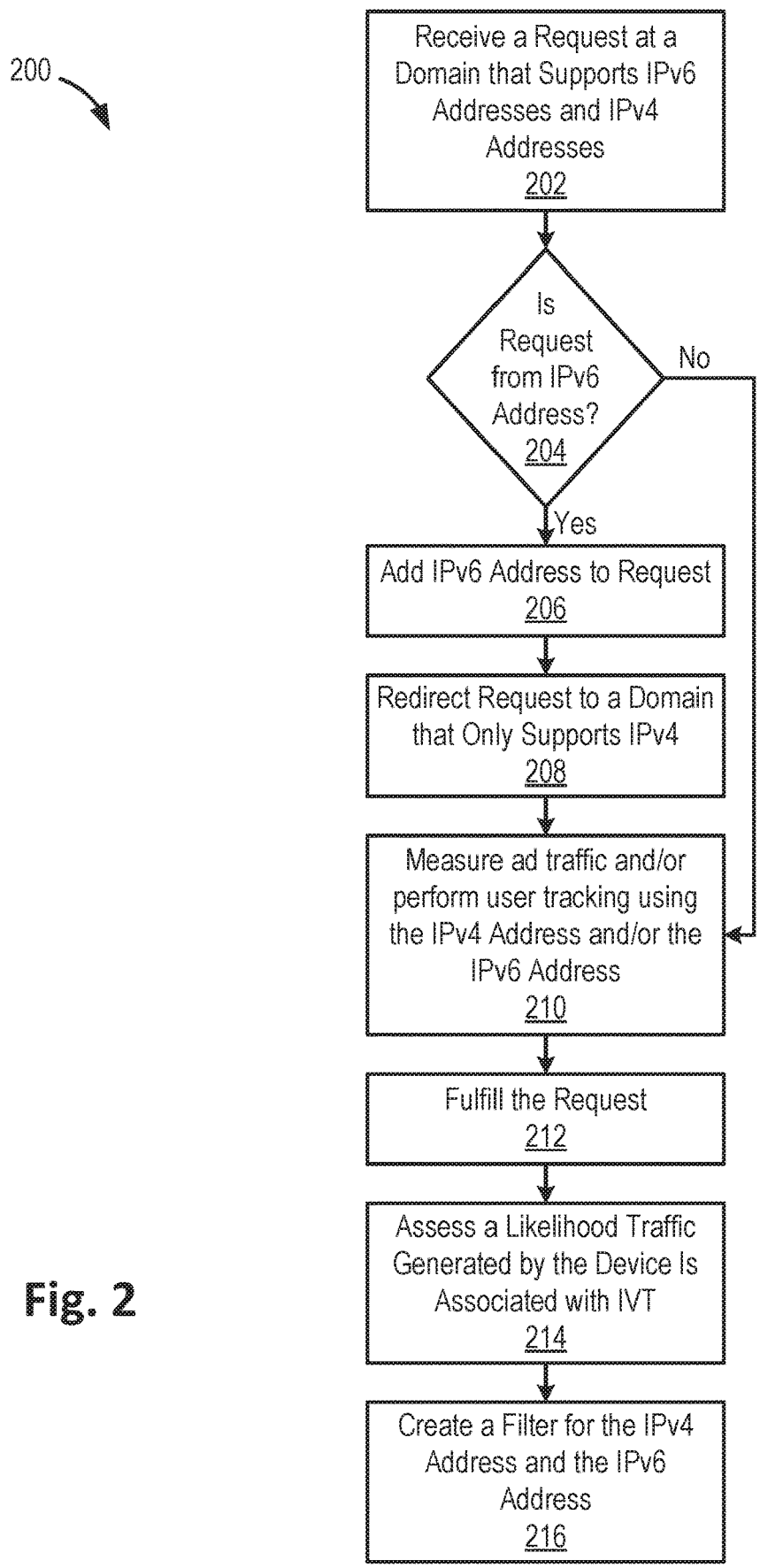
FIG. 2 is a flow diagram of an illustrative method for determining the IPv4 address and the IPv6 address of a purported end user device to use in detecting and filtering IVT, according to at least one embodiment of the present disclosure.

FIG. 2 is a flow diagram of an illustrative method 200 for determining the IPv4 address and the IPv6 address of a purported end user device, according to at least one embodiment of the present disclosure. Similar to above, determining both the IPv4 and IPv6 addresses may be used for filtering IVT. This diagram is merely an example, which should not unduly limit the scope of the claims. One of ordinary skill in the art would recognize many variations, alternatives, and modifications.

The method 200 includes receiving at a domain that supports IPv6 addresses a request from a purported end user device 104 over a network 108 (block 202). In some embodiments, the domain that supports IPv6 addresses may also support IPv4. In some embodiments, the domain may be hosted on the verification server 106 depicted in FIG. 1. In some embodiments, the request may be for an image pixel and/or a JavaScript tag that is embedded into digital content and used to assess ad traffic.

In certain embodiments, the method 200 also includes determining by the domain whether the request is from an IPv6 address (block 204). In some examples, to determine whether the purported end user device 104 has an IPv6 address, the domain determines the address to send a response to the request. In the event the address to send the response to the request is an IPv6 address, then the purported end user device 104 has an IPv6 address, according to certain embodiments. If, however, the address to send the response to the request is an IPv4 address, then the purported end user device 104 does not have an IPv6 address, according to certain embodiments.

In some examples, if the purported end user device 104 includes an IPv6 address, then the domain may add the IPv6 address to the request (block 206) and redirects the request to a domain supporting only IPv4 addresses (block 208). In some embodiments, the domain supporting only IPv4 addresses may be hosted on the verification server 106. The domain supporting only IPv4 addresses may be hosted on the same verification server 106 that supports IPv6 addresses or on a different verification server 106 than the verification server 106 that supports IPv6 addresses.

In certain embodiments, once the request is redirected to a domain supporting only IPv4, then the IPv4 address of the purported end user device 104 can be stored (e.g., retain, save, use for tracking, etc.). In some embodiments, the domain supporting only IPv4 addresses can store both the IPv4 address and the IPv6 address of the purported end user device 104. For example, the IPv6 address may be piggybacked in a header with the redirect. Alternatively, the domain supporting the IPv6 addresses can store the IPv6 address of the purported end user device 104 and the domain supporting only IPv4 addresses may store the IPv4 address of the purported end user device 104.

In certain embodiments, the IPv4 and/or IPv6 addresses can be used to measure ad traffic and/or perform user tracking (block 210). For example, the IPv4 and/or IPv6 addresses can be used to access a likelihood traffic is IVT, as explained in more detail below.

According to certain embodiments, the method 200 also includes fulfilling the request by the purported end user device 104 (block 212). For example, in the event the request is for an image pixel and/or a JavaScript tag, then the domain supporting IPv4 addresses can fulfill the request for the image pixel and/or the request for the JavaScript tag at block 212.

In some embodiments, the method 200 may include assessing a likelihood that traffic generated by, or purportedly generated by, the purported end user device 104 is IVT (block 214). Exemplary embodiments for assessing a likelihood traffic generated by the purported end user device 106 is IVT are described in more detail in U.S. Provisional Patent Application No. 62/916,896, titled, "SERVER-SIDE AD INSERTION PROXY FRAUD DETECTION SYSTEM," filed Oct. 18, 2019, (Pixalate, applicant), the entire contents of which are incorporated herein by reference for all purposes.

Additionally, or alternatively, the method 200 may include creating a filter for the traffic bearing the IPv4 address and the IPv6 address when it is likely such traffic is generated by the purported end user device 104 is IVT (block 216). Because both the IPv4 and the IPv6 addresses of the purported end user device 104 are known, the embodiments disclosed herein more effectively block IVT associated with purported end user devices 104. As such, due to the filtering of IVT bearing the IPv4 address and the IPv6 address of the purported end user device 104, the traffic generated by, or purportedly generated by, the purported end user device 104 will not be included in valid traffic and, therefore, a more accurate representation of impression data can be determined, according to certain embodiments.

Conversely, if only the traffic bearing the IPv6 address of the purported end user device 104 is detected as IVT and filtered, then the traffic bearing the IPv4 address of the purported end user device 104 may not be detected as IVT because the purported end user device 104 can still create, or purport to create, web traffic bearing an unidentified IPv4 address. As such, the embodiments disclosed herein provide a technical solution to a technical problem that is rooted in computer technology.

Figure 3:
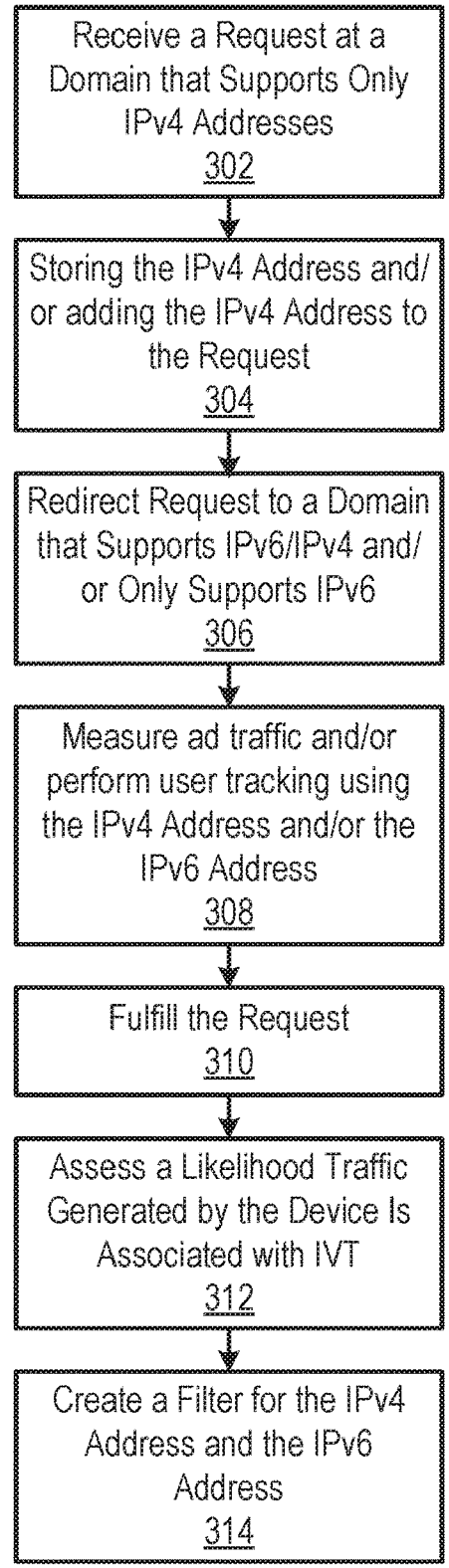
FIG. 3 is a flow diagram of another illustrative method for determining the IPv4 address and the IPv6 address of a purported end user device to use in detecting and filtering IVT, according to at least one embodiment of the present disclosure.

FIG. 3 is a flow diagram of an illustrative method 300 for determining the IPv4 address and the IPv6 address of a purported end user device, according to at least one embodiment of the present disclosure. Similar to above, determining both the IPv4 and IPv6 addresses may be used for filtering IVT. This diagram is merely an example, which should not unduly limit the scope of the claims. One of ordinary skill in the art would recognize many variations, alternatives, and modifications.

According to certain embodiments, the method 300 receives, at a domain that only supports IPv4 addresses, a request from a purported end user device 104 over a network 108 (block 302). In some embodiments, the domain may be hosted on the verification server 106 depicted in FIG. 1. In some embodiments, the request may be for an image pixel and/or a JavaScript tag that is embedded into digital content and used to assess ad traffic. In certain embodiments, the method 300 can store the IPv4 address and/or adds the IPv4 address to a redirect request (block 304).

In certain examples, the method 300 redirects the request to a domain supporting both IPv4 and IPv6 addresses (block 306). In some embodiments, the domain supporting IPv4 and IPv6 addresses is hosted on the verification server 106. The domain supporting IPv4 and IPv6 addresses may be hosted on the same verification server 106 that only supports IPv4 addresses or on a different verification server 106 than the verification server 106 that only supports IPv4 addresses.

In certain embodiments where the redirect is successful and the purported end user device 104 includes an IPv6 address, the IPv6 address of the purported end user device 104 can be stored. In some embodiments, the domain supporting IPv4 and IPv6 addresses can store both the IPv4 address and the IPv6 address of the purported end user device 104. For example, the IPv4 address may be piggy-backed in a header with the redirect.

In certain embodiments, the IPv4 and/or IPv6 addresses can be used to measure ad traffic and/or perform user tracking (block 308). For example, the IPv4 and/or IPv6 addresses can be used to access a likelihood traffic is IVT, as explained in more detail below.

According to certain embodiments, the IPv4 address of a purported end user device 104 is merged with the IPv6 address of the purported end user device 104. To merge the IPv4 and IPv6 addresses of a purported end user device 104, the instance identifier of the ping for the request of the domain that only supports IPv4 addresses is included the redirect to the domain that includes IPv4 and IPv6 addresses, so the IPv4 address of the purported end user device 104 can be matched to the IPv6 address of the purported end user device 104. According to certain embodiments, the pings that come from the domain that supports IPv4 and IPv6 addresses are not counted as pings and instead just the IPv6 address of the purported end user device 104 is merged with the ping from the request to the domain that only supports IPv4 addresses.

In certain embodiments, after storing the IPv6 address, the request by the purported end user device 104 is fulfilled (block 310). For example, in the event the request is for an image pixel and/or a JavaScript tag, then the domain supporting IPv4 and IPv6 addresses can fulfill the request for the image pixel and/or the request for the JavaScript tag at block 310. Alternatively, the domain only supporting IPv4 addresses can fulfill the request for the image pixel and/or the request for the JavaScript tag at block 310.

In some embodiments, the method 300 may include assessing a likelihood that traffic generated by, or purportedly generated by, the purported end user device 104 is IVT (block 312). Exemplary embodiments for assessing a likelihood traffic generated by the purported end user device 106 is IVT are described in more detail in U.S. Provisional Patent Application No. 62/916,896, titled, "SERVER-SIDE AD INSERTION PROXY FRAUD DETECTION SYSTEM," filed Oct. 18, 2019, (Pixalate, applicant), the entire contents of which are incorporated herein by reference for all purposes.

Additionally, or alternatively, the method 300 may include creating a filter for the traffic bearing the IPv4 address and the IPv6 address when it is likely such traffic generated by the purported end user device 104 is IVT (block 314). Because both the IPv4 and the IPv6 addresses of the purported end user device 104 are known, the embodiments disclosed herein more effectively block IVT associated with purported end user devices 104. As such, due to the filtering of IVT bearing the IPv4 address and the IPv6 address of the purported end user device 104, the traffic generated by, or purportedly generated by, the purported end user device 104 will not be included in valid traffic and, therefore, a more accurate representation of impression data can be determined, according to certain embodiments.

Conversely, if only the traffic bearing the IPv6 address of the purported end user device 104 is detected as IVT and filtered, then the traffic bearing the IPv4 address of the purported end user device 104 may not be detected as IVT because the purported end user device 104 can still create, or purport to create, web traffic bearing an unidentified IPv4 address and vice versa. As such, the embodiments disclosed herein provide a technical solution to a technical problem that is rooted in computer technology.

Figure 4:
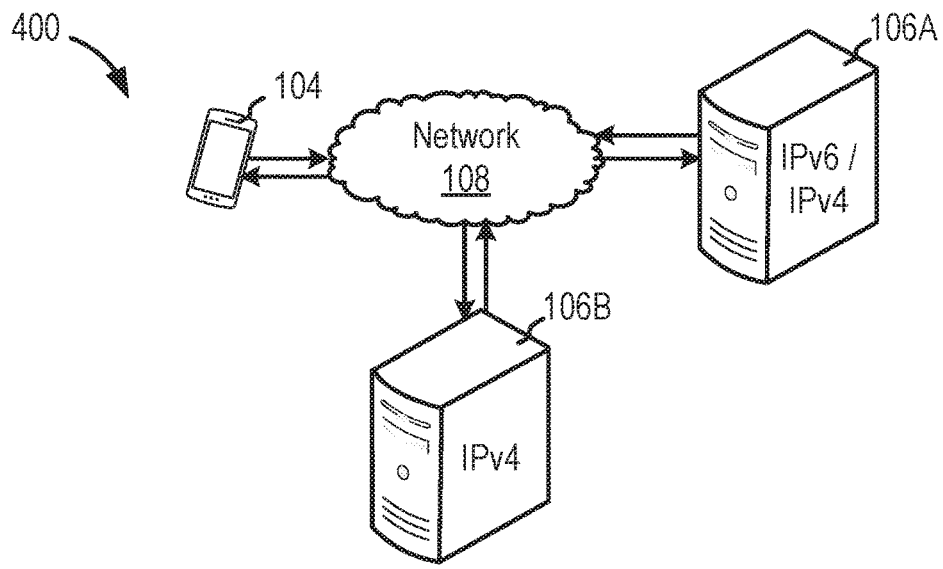
FIG. 4 is a schematic drawing of an illustrative configuration for determining the IPv4 address and the IPv6 address of a purported end user device, according to at least one embodiment of the present disclosure.
Figure 5:
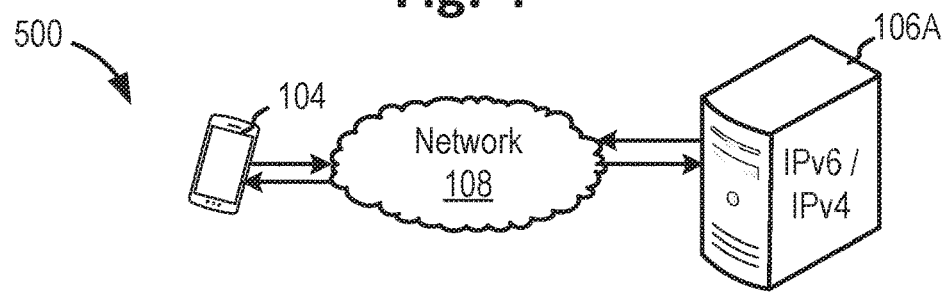
FIG. 5 is a schematic drawing of another illustrative configuration for determining the IPv4 address and the IPv6 address of a purported end user device, according to at least one embodiment of the present disclosure.
Figure 6:
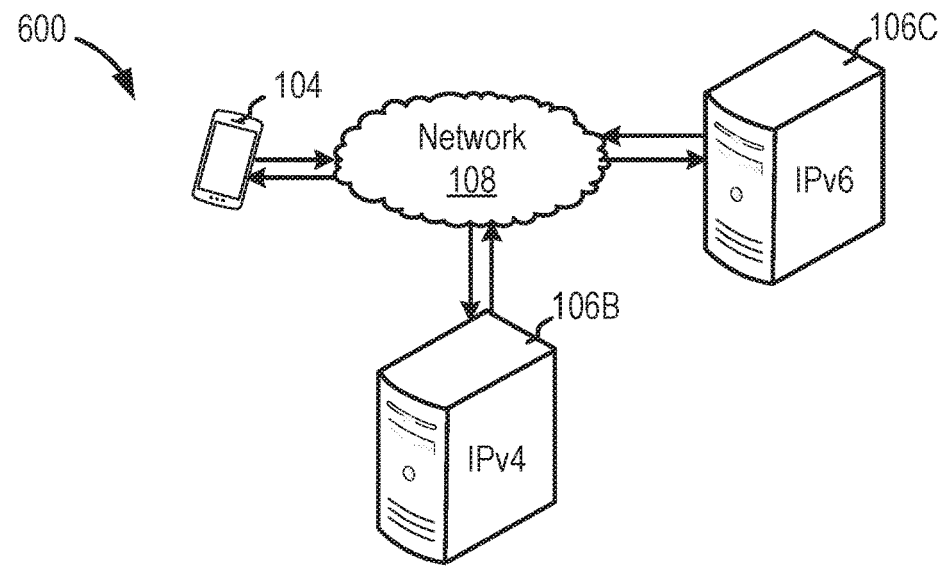
FIG. 6 is a schematic drawing of even another illustrative configuration for determining the IPv4 address and the IPv6 address of a purported end user device, according to at least one embodiment of the present disclosure.

FIGS. 4-6 are schematic drawings of illustrative configurations for determining the IPv4 address and the IPv6 address of a purported end user device, according to embodiments of the present disclosure. These diagrams are merely examples, which should not unduly limit the scope of the claims. One of ordinary skill in the art would recognize many variations, alternatives, and modifications.

Referring to FIG. 4, the configuration 400 includes a purported end user device 104 that communicates with a server 106A and/or a server 106B over a network 108. According to certain embodiments, the purported end user device 104 sends, or purports to send, a request to the server 106B. In the illustrated embodiment, the server 106B hosts a domain that only supports IPv4. As mentioned above, the request may be for an image pixel and/or a JavaScript tag used to track web traffic. According to certain embodiments, the server 106B saves the IPv4 address and fulfills the request by, for example, providing the image pixel and/or the JavaScript tag.

In certain embodiments, the server 106B also redirects the request to the server 106A. To redirect the request, the first server 106B may send a hypertext transfer protocol (HTTP) 302 redirect to the purported end user device 104, which then submits the request to another server 106A, assuming the redirect is successful. The IPv6 address is then saved once the request is sent to the server 106A. In some embodiments, the server 106A hosts a domain that supports both IPv4 and IPv6. Alternatively, instead of storing the IPv4 address, the server 106B may add the IPv4 address to the request (e.g., piggybacking the address in a header) and redirect the request to the server 106A. The server 106A may then store the IPv6 address and the IPv4 address of the purported end user device 104 (if the IPv4 wasn't previously stored) and fulfill the request from the purported end user device 104 by, for example, providing the image pixel and/or the JavaScript tag.

If the redirect is unsuccessful (because, for example, the purported end user device 104 does not allow redirects), the IPv4 is still saved due to the request being sent to the server 106B first.

According to certain other embodiments, the purported end user device 104 sends, or purports to send, a request to the server 106A first. In the illustrated embodiment, the server 106A hosts a domain that supports both IPv6 and IPv4. As mentioned above, the request may be for an image pixel and/or a JavaScript tag used to track web traffic. If the purported end user device 104 only includes an IPv4 address, then the server 106A may save the IPv4 address and fulfill the request by, for example, providing the image pixel and/or the JavaScript tag.

In the event the purported end user device 104 includes both an IPv6 address and an IPv4 address, then the server 106A may store the IPv6 address of the purported end user device 104 and redirect the request to the second server 106B. To redirect the request, the first server 106A may send a hypertext transfer protocol (HTTP) 302 redirect to the purported end user device 104, which then submits the request to another server 106B. In some embodiments, the server 106B may host a domain that only supports IPv4. Alternatively, instead of storing the IPv6 address, the server 106A may add the IPv6 address to the request (e.g., piggybacking the address in a header) and redirect the request to the server 106B. The server 106B may then store the IPv6 address and the IPv4 address of the purported end user device 104 (if the IPv6 wasn't previously stored) and fulfill the request from the purported end user device 104 by, for example, providing the image pixel and/or the JavaScript tag.

FIG. 5 illustrates another configuration 500 for determining both IPv4 and IPv6 addresses of a purported end user device 104, according to at least one embodiment of the present disclosure. In this embodiment, the purported end user device 104 sends a request to a server 106A. In the illustrated embodiment, the server 106A hosts a domain that supports both IPv6 and IPv4. Similar to above, the request may be for an image pixel and/or a JavaScript tag used to track web traffic. In the event the purported end user device 104 only includes an IPv4 address, then the server 106A may store the IPv4 address and fulfills the request, according to certain embodiments.

In the event the purported end user device 104 includes both an IPv6 address and an IPv4 address, then the server 106A may either (i) store the IPv6 address when receiving the request or (ii) add the IPv6 address to the request (e.g., piggybacking the address in a header). In either case, the server 106A may redirect the request to itself so the IPv4 domain receives the request. In certain embodiments, the server 106A then stores the IPv4 address and the IPv6 address of the purported end user device 104 (if the IPv6 wasn't previously stored) and fulfills the request from the purported end user device 104 by, for example, providing the image pixel and/or the JavaScript tag. This embodiment may have advantages over the embodiment depicted in FIG. 3 by only having to maintain a single server 106.

FIG. 6 illustrates another configuration 600 for determining both IPv4 and IPv6 addresses of a purported end user device 104, according to at least one embodiment of the present disclosure. In this embodiment, the purported end user device 104 sends a request to a server 106C. In the illustrated embodiment, the server 106C hosts a domain that only supports IPv6. Similar to above, the request may be for an image pixel and/or a JavaScript tag used to track web traffic. If the purported end user device 104 only includes an IPv4 address, then, in the illustrated embodiment, the server 106C redirects the request to another server 106B that hosts a domain that exclusively supports IPv4. To redirect the request, the server 106C may send a hypertext transfer protocol (HTTP) 302 redirect to the purported end user device 104, which then submits the request to the IPv4 server. The second server 106B then stores the IPv4 address of the purported end user device 104 and fulfills the request from the purported end user device 104 by, for example, providing the image pixel and/or the JavaScript tag, according to certain embodiments.

In the event the purported end user device 104 includes both an IPv6 address and an IPv4 address, then the server 106C may either (i) store the IPv6 address when receiving the request or (ii) add the IPv6 address to the request (e.g., piggybacking the address in a header). In either case, the server 106C may redirect the request to the server 106B. The server 106B then stores the IPv4 address and the IPv6 address of the purported end user device 104 (if the IPv6 wasn't previously stored) and fulfills the request from the purported end user device 104 by, for example, providing the image pixel and/or the JavaScript tag, according to certain embodiments.

Figure 7:
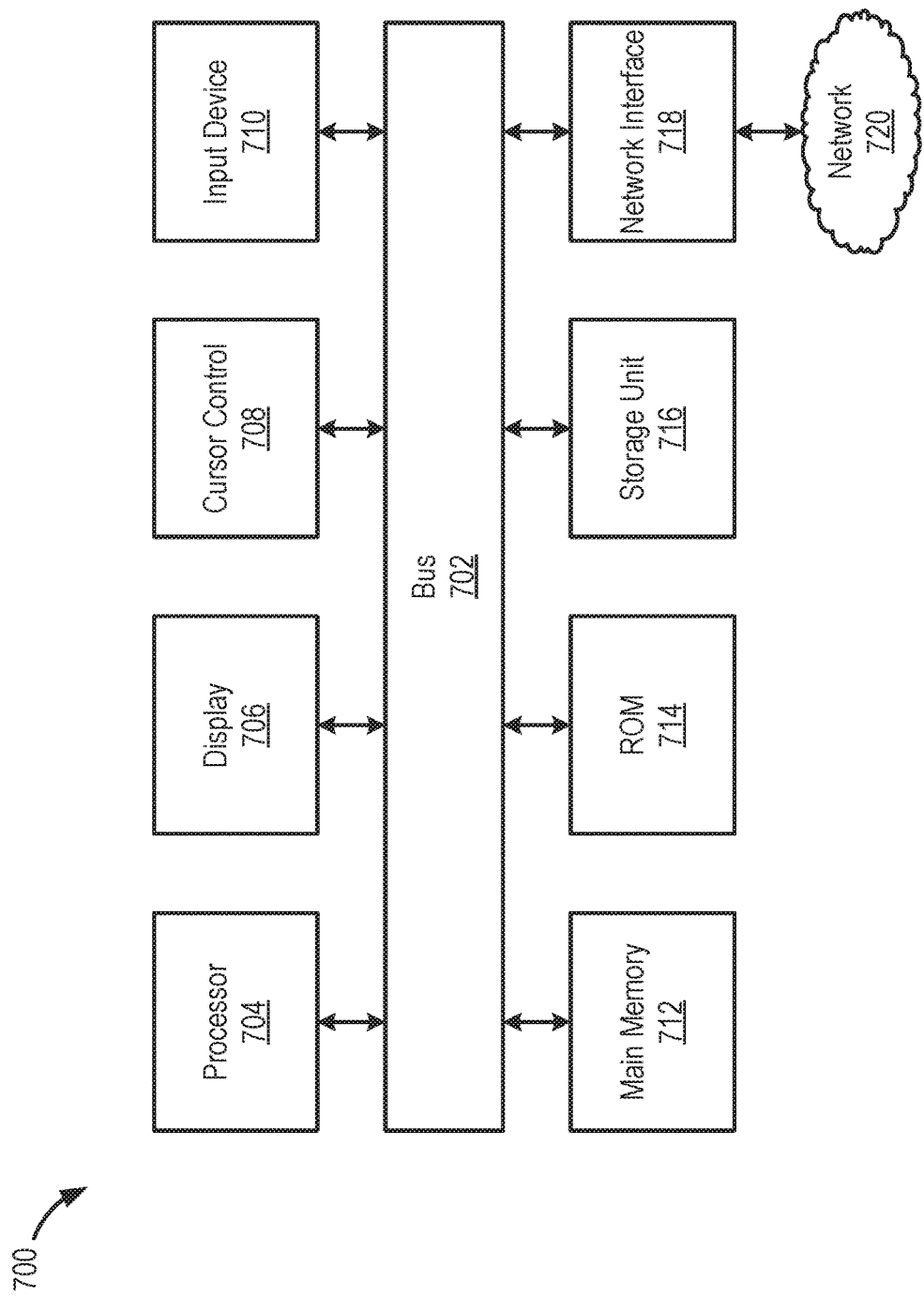
FIG. 7 is a block diagram of illustrative components of a computer system for determining the IPv4 address and the IPv6 address of a purported end user device, according to at least one embodiment of the present disclosure.

FIG. 7 is a block diagram of illustrative components of a computer system 700 for implementing a system and/or method for determining both IPv4 and IPv6 addresses of a purported end user device 104, according to at least one embodiment of the present disclosure. For example, some or all of the functions of the processes (e.g., steps) of the method 200 and/or method 300 are performed by the computing system 700. This diagram is merely an example, which should not unduly limit the scope of the claims. One of ordinary skill in the art would recognize many variations, alternatives, and modifications.

The computing system 700 includes a bus 702 or other communication mechanism for communicating information between a processor 704, a display 706, a cursor control component 708, an input end user device 710, a main memory 712, a read only memory (ROM) 714, a storage unit 716, and/or a network interface 718. In some examples, the bus 702 is coupled to the processor 704, the display 706, the cursor control component 708, the input end user device 710, the main memory 712, the read only memory (ROM) 714, the storage unit 716, and/or the network interface 718. And, in certain examples, the network interface 718 is coupled to a network 720 (e.g., the network 108).

In some examples, the processor 704 includes one or more general purpose microprocessors. In some examples, the main memory 712 (e.g., random access memory (RAM), cache and/or other dynamic storage end user devices) is configured to store information and instructions to be executed by the processor 704. In certain examples, the main memory 712 is configured to store temporary variables or other intermediate information during execution of instructions to be executed by processor 704. For example, the instructions, when stored in the storage unit 716 accessible to processor 704, render the computing system 700 into a special-purpose machine that is customized to perform the operations specified in the instructions (e.g., the method 200 and/or the method 300). In some examples, the ROM 714 is configured to store static information and instructions for the processor 704. In certain examples, the storage unit 716 (e.g., a magnetic disk, optical disk, or flash drive) is configured to store information and instructions.

In some embodiments, the display 706 (e.g., a cathode ray tube (CRT), an LCD display, or a touch screen) is configured to display information to a user of the computing system 700. In some examples, the input end user device 710 (e.g., alphanumeric, and other keys) is configured to communicate information and commands to the processor 704. For example, the cursor control 708 (e.g., a mouse, a trackball, or cursor direction keys) is configured to communicate additional information and commands (e.g., to control cursor movements on the display 706) to the processor 704.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A computer-implemented method for determining the Internet Protocol Version 4 (IPv4) address and the Internet Protocol Version 6 (IPv6) address of a purported end user device to use for detecting and filtering invalid traffic (IVT), the method comprising:

receiving, at a domain only supporting IPv4, a request from the purported end user device over a network, wherein the purported end user device comprises an IPv6 address and an IPv4 address;

redirecting, by the domain only supporting IPv4, the request to a domain supporting IPv6;

measuring ad traffic and/or performing user tracking using the IPv4 and IPv6 addresses including assessing a likelihood that traffic generated by, or purportedly generated by, the purported end user device is IVT; and fulfilling the request from the purported end user device.

2. The computer-implemented method of claim 1, wherein the domain supporting IPv6 and the domain supporting IPv4 are hosted on different servers.

3. The computer-implemented method of claim 1, wherein the domain supporting IPv4 and the domain supporting IPv6 are hosted on the same server.

4. The computer-implemented method of claim 1, wherein redirecting the request to the domain supporting IPv4 comprises sending a hypertext transfer protocol (HTTP) 302 redirect to the purported end user device.

5. The computer-implemented method of claim 1, wherein the domain supporting IPv6 is hosted on a dual-stack server.

6. The computer-implemented method of claim 1, wherein the request is in response to loading an image pixel.

7. The computer-implemented method of claim 1, wherein the request is in response to loading a JavaScript tag.

8. The computer-implemented method of claim 1, further comprising filtering traffic bearing the IPv6 address and the IPv4 address of the end user device when it is likely the traffic generated by, or purportedly generated by, the purported end user device is IVT.

9. One or more servers for determining the IPv4 address and the IPv6 address of a purported end user device to use for detection and filtering of IVT, the one or more servers comprising: one or more processors; and memory comprising instructions that, when executed, cause the one or more processors to:

receive, at a domain only supporting IPv4, a request from the purported end user device over a network, wherein the purported end user device comprises an IPv6 address and an IPv4 address;

redirect, by the domain only supporting IPv4, the request to a domain supporting IPv6;

measure ad traffic and/or performing user tracking using the IPv4 and IPv6 addresses including assessing a likelihood that traffic generated by, or purportedly generated by, the purported end user device is IVT; and fulfill the request from the purported end user device.

10. The one or more servers of claim 9, wherein the domain supporting IPv6 and the domain supporting IPv4 are hosted on different servers of the one or more servers.

11. The one or more servers of claim 9, wherein the domain supporting IPv4 and the domain supporting IPv6 are hosted on the same server of the one or more servers.

12. The one or more servers of claim 9, wherein to redirect the request to the domain supporting IPv4 the memory comprising instructions that, when executed, cause the one or more processors to send a hypertext transfer protocol (HTTP) 302 redirect to the purported end user device.

13. The one or more servers of claim 9, wherein the domain supporting IPv6 is hosted on a dual-stack server.

14. The one or more servers of claim 9, wherein the request is in response to loading an image pixel.

15. The one or more servers of claim 9, wherein the request is in response to loading a JavaScript tag.

16. The one or more servers of claim 9, the memory comprising instructions that, when executed, cause the one or more processors to filter traffic bearing the IPv6 address and the IPv4 address of the end user device when it is likely the traffic generated by, or purportedly generated by, the purported end user device is IVT.

17. A computer-implemented method for determining the Internet Protocol Version 4 (IPv4) address and the Internet Protocol Version 6 (IPv6) address of a purported end user device to use for detecting and filtering invalid traffic (IVT), the method comprising:

receiving, at a domain supporting IPv6, a request from the purported end user device over a network, wherein the purported end user device comprises an IPv6 address and an IPv4 address;

redirecting, by the domain supporting IPv6, the request to a domain only supporting IPv4;

measuring ad traffic and/or performing user tracking using the IPv4 and IPv6 addresses, including assessing a likelihood that traffic generated by, or purportedly generated by, the purported end user device is IVT; and fulfilling the request from the purported end user device.

18. The computer-implemented method of claim 17, wherein the domain supporting IPv6 and the domain supporting IPv4 are hosted on different servers.

19. The computer-implemented method of claim 17, wherein the domain supporting IPv4 and the domain supporting IPv6 are hosted on the same server.

20. The computer-implemented method of claim 17, further comprising filtering traffic bearing the IPv6 address and the IPv4 address of the end user device when it is likely the traffic generated by, or purportedly generated by, the purported end user device is IVT.

* * * * *